United States Patent
Brame

[19]

[11] Patent Number: 5,180,110
[45] Date of Patent: Jan. 19, 1993

[54] BLOW TUBE REMOVAL

[75] Inventor: Warren L. Brame, Castle Hill, Australia

[73] Assignee: Hosokawa Micron Australia Pty. Ltd., Wetherill Park, Australia

[21] Appl. No.: 744,299

[22] Filed: Aug. 13, 1991

[30] Foreign Application Priority Data

Aug. 14, 1990 [AU] Australia .............................. PK1708

[51] Int. Cl.$^5$ .............................................. B05B 1/20
[52] U.S. Cl. ...................................... 239/566; 55/302; 55/341.1; 239/567
[58] Field of Search ................... 55/302, 341.1, 361, 55/362, 369; 239/566, 567, 568

[56] References Cited

U.S. PATENT DOCUMENTS

| 3,099,395 | 7/1963 | Petersen | 239/567 |
| 3,598,315 | 8/1971 | Seymour | 239/568 X |
| 4,113,449 | 9/1978 | Bundy | 55/302 X |
| 4,195,785 | 4/1980 | Blanzy | 239/566 |
| 4,257,559 | 3/1981 | Noven | 239/566 X |
| 4,302,228 | 11/1981 | Ritter | 55/302 |
| 4,475,934 | 10/1984 | Kordas | 55/302 |

Primary Examiner—Charles Hart

[57] ABSTRACT

A dust collector blow tube having a blow tube (22) being open at a first end (32) and closed at a second end (36), the first end being reasonably and sealingly received over a supply pipe (12); the second end (36) being acted up by pressure means to place pressure on the second end (36) to force the first end (32) over the supply pipe (12); the pressure means is a cylinder (42) mounted about a vertical shaft (44) parallel to but spaced from the longitudinal axis of the cylinder (42) so as to provide a cam effect, rotation of the cylinder (42) about the vertical shaft (44) providing the necessary pressure.

5 Claims, 2 Drawing Sheets

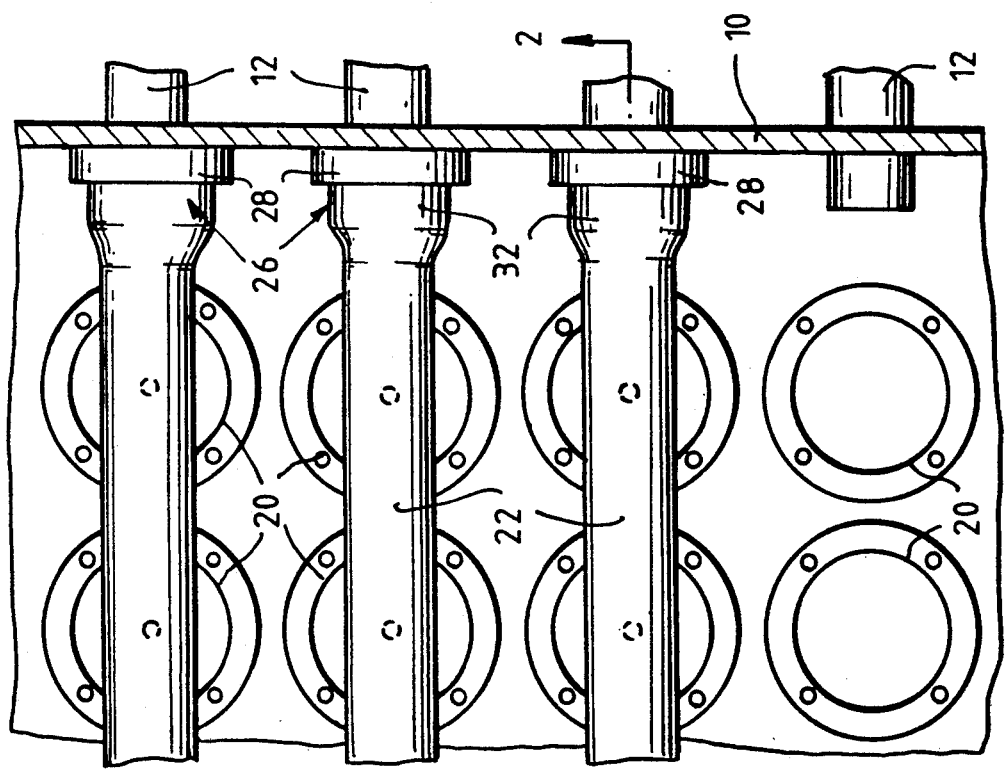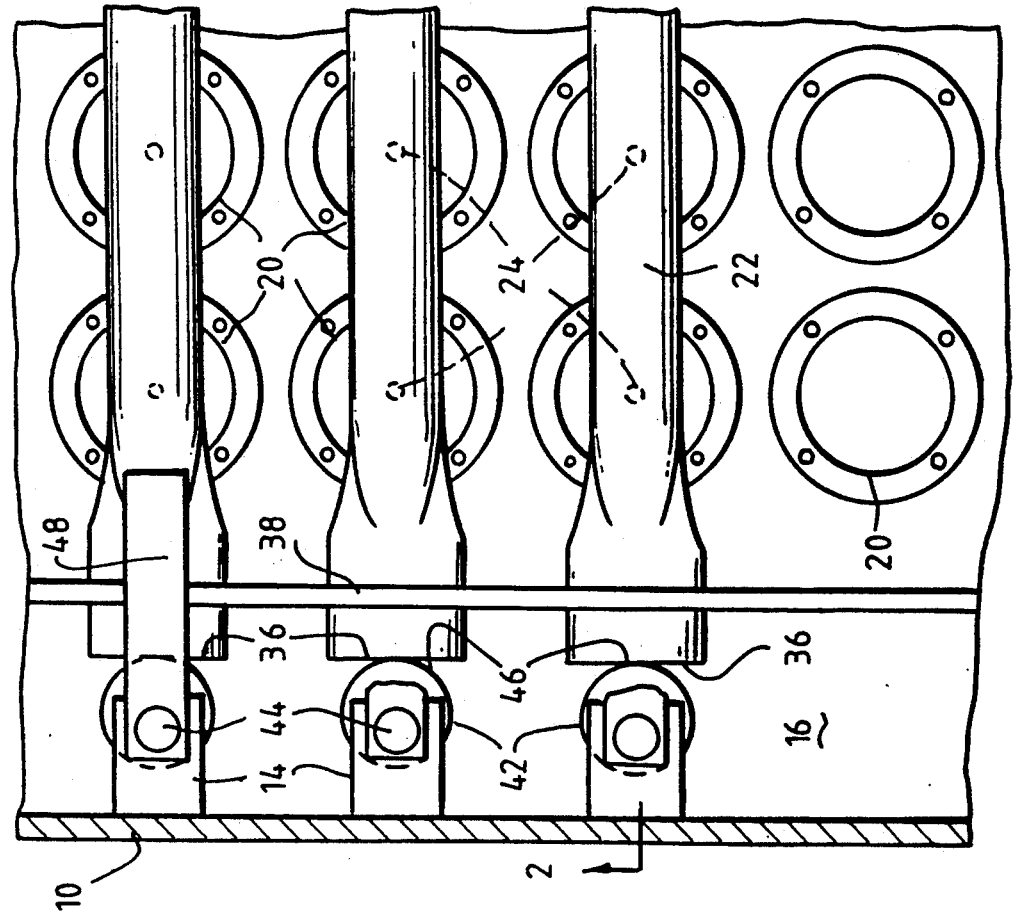

BLOW TUBE REMOVAL

TECHNICAL FIELD

This invention relates to dust collectors and refers particularly, though not exclusively to means for holding dust collector blow tubes in position.

For industrial processes quite often dust collectors are used for the removal of dust or the like from air used in the process. Dust collectors use blow tubes, each tube having a plurality of nozzles for directing the air into a matching number of dust collecting bags. To remove the bags requires removal of the relevant blow tube. To remove the blow tube requires the use of a fitter, as the air connections must be disconnected. Not only is this time consuming, but as a fitter must be used, it is also expensive.

OBJECTS OF THE INVENTION

It is therefore the principal object of the present invention to provide dust collector blow tubes that are relatively easily inserted and removed.

A further object of the present invention is to provide dust collector blow tubes that may be inserted and removed by relatively unskilled labour.

SUMMARY OF THE INVENTION

With the above and other objects in mind, the present invention provides a dust collector blow tube comprising a blow tube being open at a first end and closed at a second end, said first end being adapted to be releasably and sealingly received over a supply pipe; said second end being adapted to be acted upon by pressure means so as to place pressure on said second end of said blow tube to force said first end over said supply pipe; characterised in that said pressure means comprises a cylinder mounted about a substantially vertical shaft spaced from and substantially parallel to its longitudinal axis so as to provide a cam effect, rotation of said cylinder about said vertical axis providing said pressure.

In order that the invention may be readily understood, there shall now be described by way of example only a preferred construction of a dust collector incorporating the principal features of the present invention, the description being with reference to the accompanying illustrative drawings.

BRIEF DESCRIPTION OF THE DRAWINGS

In the drawings

FIG. 1 is a horizontal cross-sectional view of a dust collector; and

DETAILED DESCRIPTION OF THE PREFERRED EMBODIMENTS

Figure 2:
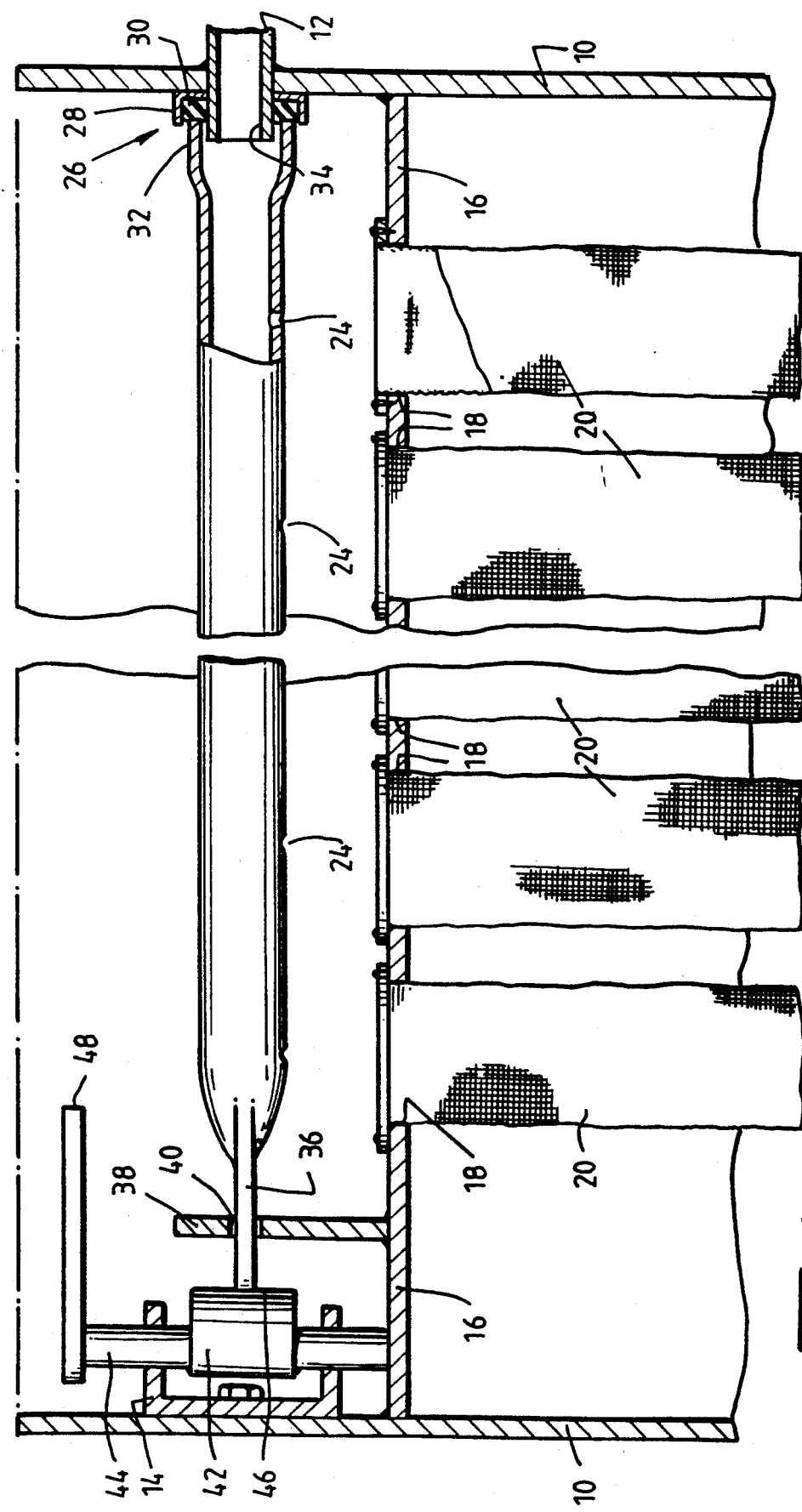
FIG. 2 is a vertical cross-sectional view along the lines of an din the direction of arrows 2—2 of FIG. 1.

To refer to the drawing, there is shown a dust collector having an outer wall 10. Through the wall 10 pass a number of air supply pipes 12. A main plate 16 is provided which is securely attached at its perimeter to the outer wall 10. The main plate 16 has a plurality of openings 18 therethrough into each of which is releasably located a dust bag 20.

To supply the air to the dust bags there is provided a plurality of blow tubes 22, each of which has a number of downwardly directed openings 24—there being one opening 24 for each bag 20.

To provide a relatively air and dust tight means for the air to pass from each supply pipe 12 to its relative blow tube 22 the wall 10 has a seal generally designated as 26. The seal 26 has a sleeve 28 which extends radially outwardly from the tube 22 and axially inwardly from the wall 10. It is concentric with the supply pipe 12. The sleeve 28 forms a cup-like shape with the tube 22. On the inner surface of the sleeve 28 is provided a gasket 30 to seal around the supply pipe 12 and onto which can be forced a first or open end 32 of the blow tube 22. Preferably, the open end 32 of the blow tube 22 is of enlarged diameter so that it fits over the inner end 34 of the supply pipe 12.

The second end 36 of the blow tube 22 is closed by being flattened, the closing acting to force all of the air out through the openings 24. An end plate 38 is provided and which is secured to the main plate 16 and generally parallel to the wall 10. For each blow tube 22 the end plate 38 has a slot 40 through each of which can pass the ends 36 of the blow tubes 22.

Again for each of the blow tubes 22 there is provided a means to force the end 32 of the blow tube 22 against the gasket 30. This means comprises a cylinder 42 mounted on a substantially vertical shaft 44 parallel to but spaced apart from the longitudinal axis of the cylinder 42. The shaft 44 is rotatably mounted in a bracket 14 attached to the main plate 16. The cylinder 42 is secured on the shaft 44 or is integral therewith. This allows the cylinder 42 to form a cam effect such that rotation of the cylinder 42 (and the shaft 44) causes the cylinder wall 46 against end 36 of the blow tube 22 to force end 32 against the gasket 30. Preferably, a handle 48 is secured to or integral with the shaft 44 to assist the rotation of the shaft 44 and cylinder 42.

Therefore, to remove the dust bags 20, the handle 48 is rotated to cause the shaft 44 and cylinder 42 to rotate so that the cylinder wall 46 no longer contacts the end 36 blow tube 22. The blow tube 22 can then be moved axially to the left to allow end 32 to clear the wall 28. The blow tube 22 can then be easily removed. This allows removal of the dust bags 20.

To replace the dust bags 20 and the blow tubes 22 is simply the reverse of the above procedure.

Whilst there has been described in the foregoing description a preferred construction of a dust collector incorporating the principal features of the present invention, it will be understood by those skilled in the art that many variations or modifications in details of design or construction may be made without departing from the ambit of the following claims.

I claim:

1. A dust collector blow tube comprising a blow tube being open at a first end and closed at a second end, said first end being adapted to be reasonably and sealingly received over a supply pipe; said second end being adapted to be acted up by pressure means so as to place pressure on said second end of said blow tube to force said first end over said supply pipe; characterised in that said pressure means comprises a cylinder mounted about a substantially vertical shaft substantially parallel to but spaced from the longitudinal axis of said cylinder so as to provide a cam effect, rotation of said cylinder about said vertical shaft providing said pressure.

2. A dust collector as claimed in claim 1, characterised in that there is provided a sleeve extending radially outwardly and axially inwardly from said supply pipe so as to cover a gasket; said first end acting upon said gasket so as to provide said seal.

3. A dust collector as claimed in claim 2, characterised in that said first end is of larger diameter than the remainder of said blow tube so as to allow said first end to pass over said supply pipe.

4. A dust collector as claimed in claim 1, characterised in that said second end is closed by being flattened, said flattened second end passing through an opening in an end plate substantially parallel to and spaced from said vertical shaft.

5. A dust collector as claimed in claim 1, characterised in that there is provided a handle secured to or integral with said vertical shaft.

* * * * *